United States Patent [19]

Horiuchi et al.

[11] Patent Number: 5,112,913

[45] Date of Patent: May 12, 1992

[54] POLYESTER COMPOSITIONS AND MOLDED ARTICLES THEREFROM

[75] Inventors: Kenjiro Horiuchi, Aichi; Kiichi Kometani, Nagoya; Toshihide Inoue, Ichinomiya, all of Japan

[73] Assignee: Toray Industries, Inc., Japan

[21] Appl. No.: 561,233

[22] Filed: Jul. 26, 1990

Related U.S. Application Data

[63] Continuation of Ser. No. 762,075, Oct. 24, 1989, abandoned, which is a continuation of Ser. No. 821,737, Dec. 30, 1985, abandoned.

[30] Foreign Application Priority Data

May 1, 1984 [JP] Japan ................. 59-86091

[51] Int. Cl.$^5$ .................. C08L 69/00; C08L 67/02
[52] U.S. Cl. .................. 525/133; 525/146; 525/148
[58] Field of Search .............. 525/67, 133, 146, 148, 525/439

[56] References Cited

U.S. PATENT DOCUMENTS

| | | | |
|---|---|---|---|
| 4,172,859 | 10/1979 | Epstein | 428/402 |
| 4,444,950 | 4/1984 | Sakano | 525/146 |
| 4,461,871 | 7/1984 | Kometani et al. | 525/166 |
| 4,639,481 | 1/1987 | Giles | 525/148 |
| 5,021,508 | 6/1991 | Taubitz | 525/133 |

FOREIGN PATENT DOCUMENTS

| | | |
|---|---|---|
| 54-91557 | 7/1920 | Japan. |
| 51-39749 | 4/1976 | Japan. |
| 51-89558 | 8/1976 | Japan. |
| 54-83053 | 2/1979 | Japan. |
| 55-86835 | 8/1980 | Japan. |
| 55-139448 | 10/1980 | Japan. |
| 56-30460 | 3/1981 | Japan. |
| 56-99248 | 8/1981 | Japan. |
| 56-159247 | 8/1981 | Japan. |
| 57-34152 | 2/1982 | Japan. |
| 57-26303 | 6/1982 | Japan. |
| 57-125253 | 8/1982 | Japan. |
| 57-192454 | 11/1982 | Japan. |
| 017150 | 2/1983 | Japan. |
| 58-45253 | 3/1983 | Japan. |
| 58-71941 | 4/1983 | Japan. |
| 58-91759 | 5/1983 | Japan. |
| 58-47419 | 10/1983 | Japan. |
| 58-171438 | 10/1983 | Japan. |
| 0201842 | 11/1983 | Japan. |
| 59-174646 | 10/1984 | Japan. |
| 174646 | 10/1984 | Japan. |

*Primary Examiner*—Melvyn I. Marquis
*Assistant Examiner*—David Buttiner
*Attorney, Agent, or Firm*—Austin R. Miller

[57] ABSTRACT

The subject invention relates to the polyester compositions being composed of (a) an aromatic polyester having the relative viscosity of 1.2 to 2.0, (b) an aromatic polycarbonate having the number average molecular weight of 10,000 to 80,000, and (c) a glycidyl-group containing copolymer consisting essentially of α-olefine and glycidyl ester of α,β-ethylenically unsaturated carboxylic acid and having the melt index of 0.1 to 100. They are useful for manufacturing electric, electronic and automotive parts, being superior in flow property and melt stability on molding, as well as in mechanical properties particularly in impact and hot-air aging resistance. The compositions can be molded to form various articles by conventional molding methods.

14 Claims, No Drawings

POLYESTER COMPOSITIONS AND MOLDED ARTICLES THEREFROM

This application is a continuation, of application Ser. No. 262,075, filed Oct. 24, 1988 which is a continuation of application Ser. No. 821,737, filed Dec. 30, 1985, now abandoned.

FIELD OF ART

The subject invention relates to the polyester compositions being superior in flow property and melt stability on molding, as well as in mechanical properties particularly in impact resistance and hot-air aging deterioration resistance, and to the molded articles therefrom.

BACKGROUND ART

Having superior characteristics, aromatic polyesters that are represented by polyethylene terephthalate and polybutylene terephthalates are extensively used for manufacturing electric, electronic and automotive parts for example. However, their uses do not increase because of their low impact resistances. Therefore, it has hitherto been proposed to blend therein various kinds of polymers such as butadiene rubbers and acrylic elastomers. Among these blending methods, those with the copolymers being composed of such monomers as α-olefin and glycidyl ester of α,β-ethylenically unsaturated acid that are mentioned in Japanese Laid-Open Patent Publication (Kokai) No. 32045/1977 and the U.S. Pat. No. 4461871 are comparatively superior to the others in improving effect of impact resistance and melt stability on molding. Nevertheless, in these methods, there is a problem that molded articles deteriorate in the impact resistance by hot-air aging in an oven. Further, the blendings of aromatic polycarbonates and acrylic elastomers to polybutylene terephthalates that are proposed in Japanese Laid-Open Patent Publication (Kokai) 500870/1980 are not satisfiable in impact resistance despite small increase and inferior in melt stability. No method solving the above-mentioned problems has been found.

DISCLOSURE OF THE INVENTION

The object of the subject invention is to provide the aromatic polyester compositions being superior in flow property and melt stability on molding, as well as in mechanical properties particularly in impact resistance and hot-air aging resistance, and being useful for manufacturing electric, electronic and automotive parts, and their molded articles.

The object is achieved by a polyester composition composed of:
(a) an aromatic polyester having a relative viscosity of 1.2 to 2.0,
(b) an aromatic polycarbonate having a number average molecular weight, of 10,000 to 80,000, and
(c) a glycidyl group containing a copolymer consisting essentially of α-olefin and glycidyl ester of αβ-ethylenically unsaturated carboxylic acid and having a melt index of 0.1 to 100,
wherein components (a) and (b) are present in a weight ratio in the range of between 99/1 and 1/99 respectively and the component (c) is present in an amount of from 1 to 80 parts by weight per total 100 parts by weight of components (a) and (b).

The object is preferably attained by the above compositions containing an ethylene based copolymer composed of ethylene and an α-olefin having 3 to 10 carbon atoms also.

THE BEST FORMS TO PRACTICE THE INVENTION

The subject invention will be described in further details hereinafter.

The resins being used according to the subject invention contain aromatic polyesters and aromatic polycarbonates.

The former are polymers or copolymers having aromatic rings in chains and prepared by condensing mainly aromatic dicarboxylic acid (or ester forming derivative) and diol (or their ester forming derivative).

The above-mentioned aromatic dicarboxylic acids include terephthalic acid, isophthalic acid, ortho phthalic acid, 2,6-naphthalenedicarboxylic acid, 1,5-naphthalenedicarboxylic acids. bis(p-carboxyphenyl)methane, anthracenedicarboxylic acid, 4,4'-diphenyldicarboxylic acid, diphenyletherdicarboxylic acid, 1,2-bis(4-carboxyphenoxy)-ethane and so forth and ester forming derivatives thereof.

The above-mentioned aromatic dicarboxylic acid may be replaced with aliphatic dicarboxylic acids such as adipic acid, sebacic acid, azelaic acid, dodecanedionic acid and so forth. Alicyclic dicarboxylic acids such as 1,3-cyclohexanedicarboxylic acid, 1,4-cyclohexanedicarboxylic and so forth and ester forming derivatives thereof, provided they are present in an amount of less than 40 mol percents based on the total acid component.

The diols include the aliphatic diols having 2 to 10 carbon atoms such as ethylene glycol, propylene glycol, 1,4-butane diol, neopentyl glycol, 1,5-pentane diol, 1,6-hexane diol, decamethylene glycol, cyclohexanedimethanol and their mixtures. Further the small amount of long-chain glycols having molecular weights in the range of 400 to 6,000 such as polyethylene glycol, poly-1,3-propylene glycol, polytetramethylene glycol and so forth as well as their mixtures can be copolymerized.

Preferable aromatic polyesters according to the subject invention are polyethylene terephthalate, polypropylene terephthalate, polybutylene terephthalate; polyhexamethylene terephthalate, polycyclohexylenedimethylene terephthalate, polyethylene-2,6-nathalate and so forth. Most preferable thereamong are polybutylene terephthalate that has excellent mechanical strength.

The aromatic polyesters should preferably have a relative viscosity of 1.2 to 2.0, more preferably of 1.4 to 1.8 as measured by a 0.5 percent orthochlorophenol solutions at 25° C. Insufficient mechanical strength is developed or no good luster surface moldings are obtained when they are less than 1.2 or more than 2.0 respectively.

The aromatic polycarbonates according to to the subject invention are preperable by ester exchange or phosgene methods using dihydric phenol or its derivative.

The dihydric phenols are represented by the following formula:

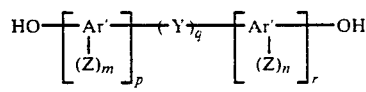

wherein Ar' denotes an aromatic group such as phenylene, biphenylene and naphthylene; Z denotes an alkyl group such as methyl and ethyl, a halogenated alkyl group, an aryl group such as phenyl and naphthyl, a halogenated aryl group, aralkyl group such as benzyl and phenylethyl, a halogenated aralkyl group, or an alicyclic group; Y denotes an alkylene group such as methylene and ethylene, an alkylidene group such as ethylidene and isopropylidene, a tertiary amino group, O, S, SO, SO₂, CO or an amide group; m and n are integers from 0 to 4; p is integer at least 1; q is 0 or 1; or r is 0 or positive integer. When q is o, r is o.

Illustrative of the dihydric phenols are;
bis(4-hydroxyphenyl)-methane;
1,1-bis(4-hydroxyphenyl)-ethane;
1,2-bis(4-hydroxyphenyl)-ethane;
2,2-bis(4-hydroxyphenyl)-propane;
1,1-bis(4-hydroxyphenyl)-propane;
2,2-bis(4-hydroxy-3-chlorophenyl)-propane;
2,2-bis(4-hydroxy-3,5-dichlorophenyl)-propane;
2,2-bis(4-hydroxy-3-bromophenyl)-propane;
2,2-bis(4-hydroxy-3,5-dibromophenyl)-propane;
2,2-bis(4-hydroxy-3-methylphenyl)-propane;
2,2-bis(4-hydroxy-3-methoxyphenyl)-propane;
1,4-bis(4-hydroxypyenyl)-cyclohexane;
1,1-bis(4-hyroxyphenyl)-cyclohexane;
1,2-bis(4-hydroxyphenyl)-ethylene;
1,4-bis(4-hydroxyphenyl)-benzene; bis(4-hydroxyphenyl)-phenylmethane; bis(4-hydroxyphenyl)-diphenylmethane;
1,1-bis(4-hydroxyphenyl)-2,2,2-trichloroethane;
bis(4-hydroxyphenyl)-ketone; bis(4-hydroxyphenyl)-sulfide;
bis(4-hydroxyphenyl)-sulfone; 4,4'-dihydroxydiphenyl ether;
4,4'-dihydroxybiphenyl; 3,3'-dihydroxybiphenyl; hydroquinone; resorcinol; 2,6-dihydroxynaphthalene; 2,7-dihydroxynathalenes; phenophthalein; and so forth. Thereamong bis(4-hydroxyphenyl)alkane is preferable and 2,2-bis(4-hydroxyphenyl)-propane is especially preferable. More than two dihydric phenols are usable in combination. They may be used together with the small quantities of alicyclic diols such as 1,4-cyclohexane diol, aliphatic diols such as 1,6-hexane diol, aromatic group containing aliphathic diols such as p-xylene glycol and so forth or can be end-capped by monohydric phenols such as phenol and p-tert-butylphenol.

The aromatic polycarbonate has the number-average molecular weight of 10,000 to 80,000, preferably of 15,000 to 40,000. The compositions can neither obtain enough mechanical properties nor hot-air aging resistance if it is less than 10,000 or inferior in moldability and mechanical properties if they are more than 80,000.

The aromatic polyester and aromatic polycarbonate according to the subject invention are present in a weight ratio in the range between 99/1 and 1/99,preferably between 80/20 and 20/80, respectively. On the contrary the synergistic effect for the increase in impact resistance of polyester compositions and the resulting increase in hot-air aging resistance are small except in the above-mentioned ranges.

Of the glycidyl-group containing copolymers consisting essentially of α-olefin and glycidyl ester of α,βethylenically unsaturated carboxylic acid, the former include ethylene, propylene, butene-1 and so forth, of which ethylene is preferable. The latter compound represented by the following general formula:

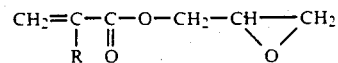

wherein R denotes a hydrogen atom, a lower alkyl group or a glycidyl-group substituted lower alkyl group. Glycidyl acrylate, glycidyl methacrylate, glycidyl ethacrylate and glycidyl itaconate are the examples. Thereof, glycidyl methacrylate is preferable. The copolymers advantageously have a glycidyl unit of α,βethylenically unsaturated carboxylic acid content in the range from 0.5 to 40 percent, preferably from 1 to 30 percent, more preferably from 2 to 20 percent by weight. If the contents are less than 0.2 percent or more than 40 percent, the copolymers do not satisfactorily increase in impact resistance or decrease in molding flowability respectively. Glycidyl esters of α,βethylenically unsaturated carboxylic acid can be copolymerized by standard copolymerization or graft reaction. Further, less than 40 percent by weight of at least one unsaturated monomers such as: vinyl ethers; vinyl acetate, propione and other vinyl esters; methyl, ethyl, propyl and butyl and other esters of acrylic or methacrylic acid; acrylonitrile; styrene; and carbon monoxide may be copolymerized with the above copolymers.

The MI (Melt Index) of glycidyl-group containing copolymer is in the range of between 0.1 and 100, preferably between 0.5 and 30, wherein the value of MI is measured at 190° C. according to ASTM D-1238 and the unit is gr./10 min. If the MI is less than 0.1 gr/10 min. or more than 100 gr/10 min. increase is small in impact resistance.

Preferable among glycidyl-group containing copolymers are ethylene / glycidyl methacrylate, ethylene / vinyl acetate / glycidyl methacrylate, ethylene / carbon monoxide /glycidyl methacrylate, ethylene / glycidyl acrylate, and ethylene / glycidyl acrylate / vinyl acetate copolymers. Among them ethylene / glycidyl methacrylate copolymer is more preferable.

The glycidyl-group containing copolymers according to the subject invention are present in an amount of from 1 to 80 parts by weight, preferably of 5 to 50 parts by weight, per the total 100 parts by weight of aromatic polyester and aromatic polycarbonate. If the amount is less than 1 part or more than 80 parts, polyester compositions do not satisfactorily increase in impact resistance or aromatic polyesters deteriorate in mechanical properties.

The compositions according to the subject invention further increase in impact resistance when containing the ethylene based copolymer being composed of ethylene and α-olefin having 3 to 10 carbon atoms and/or the diene copolymer being composed of ethylene, α-olefin having 3 to 10 carbon atoms and unconjugated diene.

The above-mentioned α-olefins include propylene, butene-1, pentene-1, 3-methylpentene-1, octacene-1, decene-1 and so forth. Thereof, propylene and butene-1 are preferable and more than two usable in combination.

The unconjugated dienes include various kinds of norbonene compounds, dicyclopentadiene compounds, tetrahydroindene compounds, 1,4-hexadiene and so forth. Preferable thereamong are 5-ethylidene-2-norbonene, dicyclopentadiene and 1,4-hexadiene.

The molar ratios of ethylene to α-olefin in the ethylene based copolymers are in the range between 40/60 and 99/1, preferably between 70/30 and 95/5, and in the diene copolymers the copolymerized ratios of α-olefin and unconjugated diene are in an amount of from 5 to 80 mol percent, preferably from 10 to 60 mol percent and from 0.1 to 20 mol percent, preferably from 0.5 to 10 mol percent, respectively.

The ethylene based copolymer and / or the diene copolymers are present in an amount of from 1 to 50 parts by weight, preferably from 5 to 40 parts by weight, per the total 100 parts by weight of aromatic polyesters and aromatic polycarbonates.

The compositions according to the subject invention can be increased in stiffness by further adding inorganic fillers. This addition generally causes the decrease in impact resistance. It is however small in the case of the compositions according to the subject invention.

Among the inorganic fillers according to the subject invention, fibrous and granular ones as well as their mixtures can be mentioned. The fibrous ones include glass, silas glass, almina, silicon carbide, ceramic, asbestos, gypsum, metal (e.g. stainless steel) and other inorganic and carbon fibers. The granular ones, on the other hand, include wollastonite, sericite, kaolin, mica, clay, bentonite, asbestos, talc, alumina silicate and other silicates; metal oxides such as alumina as well as silica, magnesium oxide, zirconium oxide and titanium oxide; carbonates such as calcium carbonate and magnesium carbonate as well as dolomite; sulfates such as calcium sulfate and barium sulfate; glass beads; boron nitride; silicon carbide; sialon. They are permitted to be hollow (e.g. hollow glass fiber, glass microballoon, silas balloon, carbon balloon, etc.). Preferable thereamong are glass fibers, carbon fibers, metal fibers, potassium titanate whisker, glass flakes, glass beads, wollastonite, mica, talc, clay, titanium oxide, aluminum oxide, calcium carbonate and barium sulfate. Particularily thereamong glass fiber is more preferable. The inorganic fillers should preferably be treated with silane, titanate or another conventional coupling agent, and glass fibers with a conventional converging agent such as epoxy resin and vinyl acetate resin.

The inorganic fillers are to be added at the ratios by weight of 3 to 100 parts, preferably of 5 to 80 parts, per the total 100 parts by weight of aromatic polyesters and aromatic polycarbonates.

The compositions according to the subject invention can be increased in impact resistance by adding the compounds for promoting the reaction between epoxy compounds and carboxylic acids. They include triphenyl amine, 2,4,6-tris(dimethylaminomethyl)phenol and other tertiary amines; triphenyl and trisodecyl phosphites and other phosphite esters; triphenylallylphosphonium bromide and other phosphonium compounds; triphenylphosphine and other tertiary phosphines; lithium, calcium and other metal stearates; sodium dodecylbenzenesulfonate and sodium 3,5-dicarbomethoxybenzenesulfonate and other metal sulfonates; sodium lauryl sulfate and other organic sulfate salts, and so forth. Their addition should be made at the ratios of 0.001 to 5 parts by weight to 100 parts by weight of aromatic polyesters.

The compositions according to the subject invention permit the addition of such quantities as not obstructing its object of more than one being selected from fibrous and granular fillers and reinforcements, antioxidants, heat stabilizers, ultraviolet ray-absorbents, lubricants, mold releasing agents, colorants including dyes and pigments, flame retardants and flame redarding assistants, antistatic agents, crystallization promotors, and other additives as well as of the small quantities of one or more than two being selected out of thermoplastic resins, thermosetting resins and thermoplastic elastomers.

The processes for producing the compositions according to the subject invention are not limited. However, preferable thereamong are to melt-extrude, by using an extruder, the dry-blendings of aromatic polyesters, aromatic polycarbonates, glycidyl group containing copolymers and, if necessary, other additives.

The resin compositions of the subject invention can be molded according to conventional methods such as injection molding, extrusion molding, and molded articles therefrom show excellent properties.

The effects of the subject invention is illustrated below in detail with reference to Examples. The Examples are by way of illustration and not by way of limitation.

EXAMPLES 1-8

The dry-blendings of the polybutylene terephthalate (PBT) having a relative viscosity of 1.56 and the amounts shown in Table 1 of the ones selected as shown therein of aromatic polycarbonates derived from 2,2'-bis(4-hydroxyphenyl)propane and glycidyl-group containing copolymers were melt-extruded and pelletized by using a screw extruder set at 250° C. The melting viscosity of these pellets was measured at 250° C. by using a koka-type flow tester. Subsequently they were molded into ASTM No. 1 dumbbells and ¼-in. wide Izod impact testpieces using a 5-oz. screw in-line type injection molding machine. While injection molding, the minimum injection (lower-limit molding) pressure required for mold charge was measured. The testpieces underwent tensile and notched Izod impact tests. Further they were kept heat-treated in an oven at 150° C. for 500 hours and subjected to tensile and notched Izod impact tests. Their results are shown in the Table 1.

TABLE 1

| | | PBT (Part by weight) | Aromatic polycarbonates | | Glycidyl-group containing copolymers | | Mechanical properties Not treated | | |
|---|---|---|---|---|---|---|---|---|---|
| | | | Kinds | Amounts (parts by weight) | Kinds | Amounts (parts by weight) | Tensile strength (kg/cm$^2$) | Elongation at break (%) | Izod impact strength (kg · cm/cm-notch) |
| Examples | 1 | 90 | A | 10 | E | 25 | 380 | 195 | 46 |
| | 2 | 70 | A | 30 | E | 25 | 383 | 200< | 59 |
| | 3 | 50 | A | 50 | E | 25 | 398 | 200< | 70 |
| | 4 | 30 | A | 70 | E | 25 | 404 | 200< | 65 |
| | 5 | 10 | A | 90 | E | 25 | 410 | 181 | 47 |
| | 6 | 70 | B | 30 | E | 25 | 380 | 190 | 41 |
| | 7 | 70 | A | 30 | E | 5 | 435 | 200< | 17 |
| | 8 | 70 | A | 30 | E | 40 | 339 | 200< | 62 |
| Comparative Examples | 1 | 100 | — | — | — | — | 569 | 120 | 3.2 |
| | 2 | 100 | — | — | E | 25 | 388 | 184 | 35 |

TABLE 1-continued

| | | | | | | | | | |
|---|---|---|---|---|---|---|---|---|---|
| 3 | 70 | A | 30 | — | — | 577 | 115 | 4.3 | |
| 4 | 50 | A | 50 | — | — | 592 | 73 | 10 | |
| 5 | 70 | A | 30 | E | 90 | 329 | 132 | 45 | |
| 6 | 98 | A | 2 | E | 25 | 375 | 195 | 37 | |
| 7 | 70 | C | 30 | E | 25 | 371 | 57 | 21 | |
| 8 | 70 | D | 30 | E | 25 | 362 | 63 | 25 | |
| 9 | 70 | A | 30 | F | 25 | 364 | 105 | 22 | |
| 10 | 70 | A | 30 | G | 25 | 365 | 51 | 16 | |
| 11 | 70 | A | 30 | H | 25 | 357 | 44 | 13 | |
| 12 | 70 | A | 30 | I | 25 | 370 | 56 | 10 | |

| | | Mechanical properties Heat-treated | | | | |
|---|---|---|---|---|---|---|
| | | Tensile strength (kg/cm$^2$) | Elongation at break (%) | Izod impact strength (kg·cm/cm-notch) | Melting viscosity (poise) | Lower limit Pressure (kg/cm$^2$) |
| Examples | 1 | 386 | 96 | 40 | 5300 | 43 |
| | 2 | 391 | 151 | 53 | 5500 | 44 |
| | 3 | 409 | 159 | 61 | 7100 | 50 |
| | 4 | 413 | 150 | 55 | 8000 | 53 |
| | 5 | 411 | 93 | 39 | 7800 | 52 |
| | 6 | 389 | 112 | 33 | 6200 | 47 |
| | 7 | 441 | 140 | 15 | 4900 | 39 |
| | 8 | 347 | 132 | 50 | 8500 | 54 |
| Comparative Examples | 1 | 572 | 15 | 1.8 | 3100 | 34 |
| | 2 | 394 | 25 | 5.5 | 5200 | 43 |
| | 3 | 586 | 32 | 3.1 | 4200 | 37 |
| | 4 | 601 | 27 | 5.3 | 6500 | 48 |
| | 5 | 332 | 59 | 27 | 14300 | 73 |
| | 6 | 391 | 51 | 8.1 | 5300 | 43 |
| | 7 | 382 | 20 | 12 | 11800 | 63 |
| | 8 | 368 | 27 | 11 | 4500 | 38 |
| | 9 | 369 | 39 | 8.5 | 4300 | 37 |
| | 10 | 357 | 25 | 7.2 | 7500 | 51 |
| | 11 | 354 | 11 | 6.3 | 13200 | 69 |
| | 12 | 365 | 20 | 4.5 | 4200 | 37 |

Note*: aromatic polycarbonates
A: number average molecular weight = 25.000
B: number average molecular weight = 62.000
C: number average molecular weight = 95,000
D: number average molecular weight = 9.000
Note**: specifications of glycidyl-group containing copolymers

| Codes | Ethylene/glycidyl methacrylate ratio by weight | M I gr./10 min. |
|---|---|---|
| E | 90/10 | 3.0 |
| F | 90/10 | 120 |
| G | 90/10 | 0.05 |
| H | 55/45 | 3.8 |
| I | 99.8/0.2 | 2.5 |

The results in the Table 1 indicates that resin compositions increase in impact resistance and their molded articles are superior in hot-air aging resistance if they contain both polycarbonates and glycidyl-group containing copolymers according to the subject invention.

EXAMPLE 9-12

Evaluation was carried out in the same manner as Example 3 except that 15 of the 25 parts by weight of the glycidyl-group containing copolymer E was replaced with the ethylene based copolymer or diene copolymers shown in Table 2. Their results are shown in Table 2.

TABLE 2

| | | Mechanical properties | | | | | | | |
|---|---|---|---|---|---|---|---|---|---|
| | | Not treated | | | Heat-treated | | | | |
| | Kinds of ethylene based copolymer or diene copolymer* | Tensile strength (kg/cm$^2$) | Elongation at break (%) | Izod impact strength (kg·cm/cm notch) | Tensile strength (kg/cm$^2$) | Elongation at break (%) | Izod Impact strength (kg·cm/cm notch) | Melting viscosity (poise) | Lower limit pressure (kg/cm$^2$) |
| Examples 9 | J | 393 | 200< | 83 | 398 | 175 | 76 | 6500 | 48 |
| 10 | K | 395 | 200< | 87 | 403 | 183 | 80 | 6300 | 47 |
| 11 | L | 389 | 200< | 82 | 394 | 166 | 73 | 6600 | 48 |
| 12 | M | 390 | 200< | 88 | 400 | 171 | 76 | 6600 | 48 |

Note*: ethylene based copolymer or diene copolymer
J: ethylene/propylene (80/20 molar raatio) copolymer MI = 1.5
K: ethylene/butene-1 (90/10 molar ratio) copolymer MI = 3
L: ethylene/propylene/dicyclopentadiene (70/28/2 molar ratio) copolymer MI = 0.8
M: ethylene/butene-1/5-ethylidene-2-norbonene (88/10/2 molar ratio) copolymer MI = 1

The results indicate that the resin compositions according to the subject invention further increase in impact strength and molding flowability when containing an ethylene based copolymer or diene copolymer.

EXAMPLES 13-14

The dry-blendings obtained by adding such amounts as shown in Table 3 of glass fibers (3 mm-long chopped strands) to the polybutylene terephthalate (PBT) having a relative viscosity of 1.45, the aromatic polycarbonate A and glycidyl-group containing copolymer E used in Examples 1 were evaluated in the same manner as it except the measuring melting viscosity and lower limit molding pressure. The results of these evaluation are also shown in the Table 3.

TABLE 3

|  |  | PBT (parts by weight) | Aromatic poly- carbonate A (parts by weight) | Glycidyl- group containing copolymer E (parts by weight) | Inorganic filler (parts by weight) | Mechanical properties | | | | | |
|---|---|---|---|---|---|---|---|---|---|---|---|
|  |  |  |  |  |  | Not treated | | | Heat-treated | | |
|  |  |  |  |  |  | Tensile strength (kg/cm$^2$) | Elonga- tion at break (%) | Izod impact strength (kg · cm/ cm-notch) | Tensile strength (kg/cm$^2$) | Elonga- tion at break (%) | Izod impact strength (kg · cm/ cm-notch) |
| Examples | 13 | 50 | 50 | 20 | 10 | 740 | 8.3 | 27 | 735 | 7.9 | 25 |
|  | 14 | 50 | 50 | 20 | 20 | 870 | 6.6 | 18 | 860 | 6.1 | 16 |
| Compara- | 13 | 60 | 60 | — | 10 | 735 | 5.2 | 3.4 | 705 | 3.8 | 3.2 |
| tive | 14 | 60 | 60 | — | 20 | 860 | 4.1 | 4.0 | 835 | 3.4 | 3.6 |
| Examples | 15 | 120 | — | 20 | 20 | 860 | 5.7 | 9.5 | 840 | 4.2 | 5.8 |

The results indicate that the compositions according to the subject invention increase in impact resistance and hot-air aging resistance as well as in stiffness if inorganic fillers are added besides.

INDUSTRIAL APPLICABILITY OF THE INVENTION

The polyester compositions according to the subject invention are useful for manufacturing electric, electronic and automative parts.

We claim:

1. A polyester composition composed of:
   (a) an aromatic polyester having a relative viscosity of 1.2 to 1.8,
   (b) an aromatic polycarbonate having a number average-molecular weight of 15,000 to 80,000, and prepared from a dihydric phenol of the formula

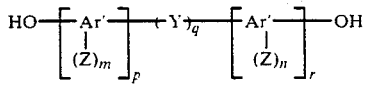

wherein Ar' denotes an aromatic structure selected from the group consisting of phenylene, biphenylene and naphthylene; Z denotes a functional group selected from the group consisting of an alkyl group, an aryl group, an aralkyl group and an alycyclic group; Y denotes a functional group selected from the group consisting of an alkylene group, an alkylidene group, a tertiary amino group, O, S. SO, SO$_2$, CO and an amide group; m and n are integers from 0 to 4; p is an integer of at least 1: q is selected from 0 and 1; r is selected from 0 and positive integers, and wherein when q is O r is also O,
   (c) a glycidyl-group containing two-component copolymer consisting of 99.5-60% by wt. of α-olefin and 0.5 to 40% by wt. of glycidyl ester of α, β-ethylenically unsaturated carboxylic acid and having a melt index of 0.1 to 100, wherein the component (c) is present in an amount of from 1 to 80 parts by weight per total 100 parts by weight of components (a) and (b), said aromatic polyester and aromatic polycarbonate being present in a weight ratio in the range of between 70/30 and 30/70 respectively.

2. The composition, as claimed in claim 1, wherein glycidyl-group containing two component copolymer is present in an amount of from 5 to 50 parts by weight per the total 100 parts by weight of said aromatic polyester and aromatic polycarbonate.

3. The composition, as claimed in claim 1, wherein the aromatic polyester is polyalkylene terephthalate.

4. The composition, as claimed in claim 3, wherein the polyalkylene terephthalate is polybutylene terephthalate.

5. The composition, as claimed in claim 1, wherein the aromatic polycarbonate is bis (4-hydroxyphenyl)alkane polycarbonate.

6. The composition, as claimed in claim 5, wherein bis(4-hydroxyphenyl)alkane is 2,2-bis(4-hydroxyphenyl)propane.

7. The composition, as claimed in claim 1, wherein the glycidyl ester of α,β-ethylenically unsaturated carboxylic acid of said glycidyl-group containing two component copolymer is selected from the group of glycidyl methacrylate and glycidyl acrylate.

8. The composition, as claimed in claim 1, wherein the α-olefin is ethylene.

9. The composition, as claimed in claim 1, further comprising an ethylene based copolymer composed of ethylene and αolefins having 3 to 10 carbon atoms in an amount of from 1 to 50 parts by weight per the total 100 parts by weight of said aromatic polyester and aromatic polycarbonate.

10. The composition, as claimed in claim 9, wherein said ethylene based copolymer is selected from the group of ethylene/propylene copolymer, ethylene/butene-1 copolymer and ethylene/propylene/butene-1 copolymer.

11. The composition, as claimed in claim 1, further comprising a diene copolymer composed of ethylene, the α-olefin having 3 to 10 carbon atoms and unconjugated diene in an amount of from 1 to 50 parts by weight per the total 100 parts by weight of said aromatic polyester and aromatic polycarbonate.

12. The composition, as claimed in claim 11, wherein said diene copolymer contains more than one being selected from propylene and butene-1 as α-olefin and more than one being selected from dicyclopentadiene, 5-ethylidene-2norbonene and 1,4-hexadiene as unconjugated diene.

13. Injection molded articles of a polyester composition composed of:
   (a) an aromatic polyester having a relative viscosity of 1.2 to 1.8.

(b) an aromatic polycarbonate having a number average molecular weight of 15,000 to 80,000, and prepared from a dihydric phenol of the formula

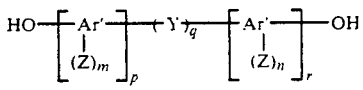

wherein Ar' denotes an aromatic structure selected from the group consisting of phenylene, bisphenylene and naphthylene; Z denotes a functional group selected from the group consisting of an alkyl group, an aryl group, an aralkyl group and an alycyclic group; Y denotes a functional group selected from the group consisting of an alkylene group, an alkylidene group, a tertiary amino group, O, S, SO, $SO_2$, CO and an amide group; m an n are integers from 0 to 4; p is an integer of at least 1: q is selected from 0 and 1; and r is selected from O and positive integers, and wherein when q is O r s also O, and
(c) a glycidyl-group containing copolymer consisting of 99.5–60% by weight of α-olefin and 0.5–40% by weight of glycidyl ester of α, β-ethylenically unsaturated carboxylic acid and having a melt index of 0.1 to 100, components (a) and (b) are present in a weight ratio in the range of between 99/1 and 1/99 by weight per the total 100 parts by weight of components (a) and (b).

14. An extrusion molded article of a polyester composition consisting of:

(a) an aromatic polyester having a relative viscosity of 1.2 to 1.8,
(b) an aromatic polycarbonate having a number average molecular weight of 15,000 to 80,000, and prepared from a dihydric phenol of the formula

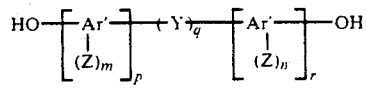

wherein Ar' denotes an aromatic structure selected from the group consisting of phenylene, bisphenylene and naphthylene; Z denotes a functional group selected from the group consisting of an alkyl group, an aryl group, an aralkyl group and an alycyclic group; Y denotes a functional group selected from the group consisting of an alkylene group, an alkylidene group, a tertiary amino group, O, S, SO, $SO_2$, CO and an amide group; m and n are integers from 0 to 4; p is an integer of at least 1: q is selected from 0 to 1; and r is selected from O and positive integers, and wherein when q is O r is also O, and
(c) a glycidyl-group containing copolymer consisting essentially of α-olefin and glycidyl ester of α, β-ethylenically unsaturated carboxylic acid and having a melt index of 0.1 to 100, wherein components (a) and (b) are present in a weight ratio in the range of between 99/1 and 1/99 and the component (c) is present in an amount of 1 to 80 parts by weight per total 100 parts by weight of components (a) and (b).

* * * * *